US008528843B2

(12) United States Patent
Murphy

(10) Patent No.: US 8,528,843 B2
(45) Date of Patent: Sep. 10, 2013

(54) BALE SPLITTER AND A METHOD FOR SPLITTING A WRAPPED BALE AND FOR SEPARATING WRAPPING MATERIAL FROM THE BALE

(75) Inventor: William Kieran Murphy, Ballyragget (IE)

(73) Assignee: Unique Inventions Company Ltd., County Kilkenny (IE)

( * ) Notice: Subject to any disclaimer, the term of this patent is extended or adjusted under 35 U.S.C. 154(b) by 396 days.

(21) Appl. No.: 13/058,078

(22) PCT Filed: Aug. 7, 2009

(86) PCT No.: PCT/IE2009/000056
§ 371 (c)(1),
(2), (4) Date: Feb. 8, 2011

(87) PCT Pub. No.: WO2010/016045
PCT Pub. Date: Feb. 11, 2010

(65) Prior Publication Data
US 2011/0155830 A1 Jun. 30, 2011

(30) Foreign Application Priority Data
Aug. 8, 2008 (IE) .................................. S2008/0657

(51) Int. Cl.
*B02C 19/00* (2006.01)
(52) U.S. Cl.
USPC .......... 241/30; 241/101.77; 241/605; 83/928; 414/412
(58) Field of Classification Search
USPC ........... 241/30, 101.72, 101.77, 605; 83/928; 414/412
See application file for complete search history.

(56) References Cited

U.S. PATENT DOCUMENTS

| 5,544,822 A | 8/1996 | Neier | 241/101.73 |
| 2008/0041989 A1 | 2/2008 | Schierman | 241/101.72 |

FOREIGN PATENT DOCUMENTS

| FR | 2883450 | 9/2006 |
| WO | WO 2006/118469 | 11/2006 |
| WO | WO 2008/071856 | 6/2008 |

OTHER PUBLICATIONS

International Search Report for International Application No. PCT/IE2009/000056, Nov. 10, 2009.

*Primary Examiner* — Mark Rosenbaum
(74) *Attorney, Agent, or Firm* — Kusner & Jaffe

(57) ABSTRACT

A bale splitter (1) for mounting on a front end loader arm of a tractor' comprises a support framework (5) having a plurality of tines (7) extending transversely therefrom for supporting a cylindrical wrapped bale (2). A pair of carrier arms (15) pivotally coupled to the support framework (5) carry a cutting blade (20) for splitting the bale (2) and for simultaneously cutting wrapping material of the bale (2). The cutting blade (20) is slightly spaced apart from the tines (7) for preventing cutting of the wrapping material (4) adjacent the tines (7) so that the wrapping material remains in one single integral piece after splitting of the bale (2). A grab (30) comprising jaws (32,33) is supported on the support framework (5) to abut the bale (2) when supported on the tines (7), and for gripping the wrapping material (4) prior to operation of the cutting blade (20) for cutting the bale (2). By tilting the bale splitter (1) the split bale is discharged and the wrapping material (4) still gripped by the grab (30) is thus separated from the split bale.

27 Claims, 5 Drawing Sheets

Figure 1:
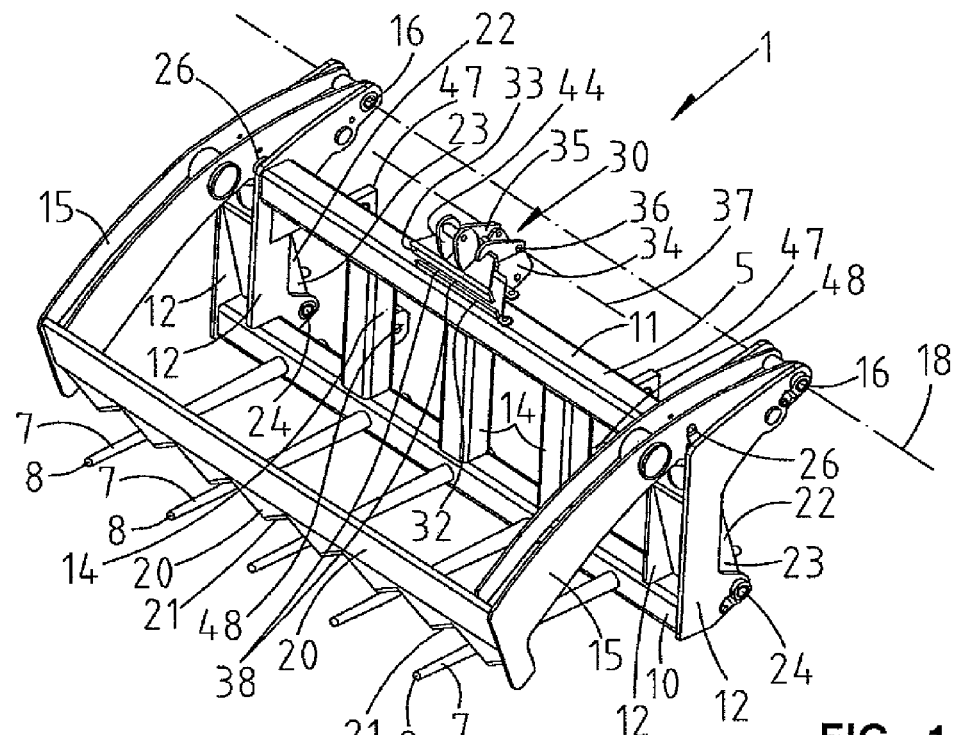

BALE SPLITTER AND A METHOD FOR SPLITTING A WRAPPED BALE AND FOR SEPARATING WRAPPING MATERIAL FROM THE BALE

The present invention relates to a bale splitter, and in particular, a tractor mountable bale splitter for splitting a wrapped bale, for example, a wrapped bale of fodder material, such as hay, straw, silage and the like, and separating wrapping material from the split bale. The invention also relates to a method for splitting a wrapped bale, and in particular, though not limited to a wrapped bale of fodder material and for separating the split bale from wrapping material.

Bales of silage, hay, straw and other fodder material, and in particular, bales of silage, are commonly wrapped in a wrapping material. Such bales may be of parallelepiped shape, or may be of cylindrical shape. Bales of cylindrical shape, in general, are referred to as round bales, and are of diameter of approximately 1.2 metres and of axial length also approximately 1.2 metres. The wrapping material, in general, is of a heavy gauge plastics film material which is provided in elongated sheet form and is provided with a self-adhesive coating on one face thereof. The plastics film material, in general, is provided on a roll, and is unwound from the roll onto the bale. The film material, in general, is wound onto the bale with one wind overlapping the next so that the self-adhesive coating of the film material bonds each wind of the film material to the previous wind thereof.

Such bales, and in general, cylindrical bales, are wrapped on a wrapping machine which rotates the bale about two mutually perpendicular axes, one axis coinciding with the central geometrical axis of the bale, and the other being an axis extending transversely relative to the central axis of the bale. As the bale is being rotated about the two mutually perpendicular axes, the film material is pulled from a roll on which the film material is tensioned in order to tightly wind the wrapping material onto the bale, and is wound onto the bale with one wind of the film material overlapping the previous wind of the film material, and bonded thereto by the self-adhesive coating on the film material.

Such bale wrappers and such plastics film wrapping material for wrapping bales of silage and other fodder material will be well known to those skilled in the art. The wrapping of such bales, in particular bales of silage material, has many advantages. Firstly, unless the film material on a wrapped bale is punctured subsequent to wrapping, the film material forms an airtight skin around the bale. This protects the wrapped fodder, and in the case of silage, permits the silage fermentation process to continue within the wrapped bale unimpeded in an airtight environment. However, the wrapping of such bales of fodder material presents a number of disadvantages, particularly when the fodder material wrapped in the bales is ready for feeding to animals. Firstly, the bale must be separated from the plastics film wrapping material, since ingestion of the film material by an animal could lead to serious health consequences. Secondly, the wrapping film material, in general, is a non-biodegradable material, and must be disposed of in an appropriate manner. Because the bales are tightly wrapped with the plastics film material, and in general, the bales are wrapped with many layers of the film material, removal of the wrapping material from the bale is quite a difficult task.

Bale splitters for splitting a bale and for simultaneously cutting the wrapping material while the bale is being split are well known. Such bale splitters typically comprise a framework which is suitable for mounting to the three-point linkage of a tractor and a pair of spaced apart parallel tines extend from the support framework for supporting the bale thereon. A cutting blade is pivotally coupled to the support framework and is urgeable downwardly by an hydraulic ram through the bale from a position above the bale to a position beneath the bale for splitting the bale in two, and in turn cutting the wrapping film, material. However, a disadvantage of such bale splitters is that the two halves of the bale when split are still retained in the wrapping material, and the wrapping material must be separated from the respective halves of the bale. This is a tedious and time-consuming task. Additionally, when the halves of the bale have been separated from the wrapping material, the wrapping material must then be collected and stored for subsequent disposal. All these tasks tend to be time-consuming and wasteful of valuable time of a farmer or a farmhand. Additionally, as each bale is split, if the operator of the bale splitter who would be operating the bale splitter from the tractor cab is unassisted, each time a bale is split, the operator of the bale splitter must descend from the tractor cab in order to separate the bale from the wrapping material. This is a considerable inconvenience.

There is therefore a need for a bale splitter which addresses at least some of these problems, and there is also a need for a method for splitting a wrapped bale and separating the wrapping material from the bale which likewise addresses at least some of these problems.

The present invention is directed towards such a bale splitter and the invention is also directed towards such a method for splitting a wrapped bale and separating the wrapping material from the bale.

According to the invention there is provided a tractor mountable bale splitter comprising a support means for supporting a wrapped bale during splitting thereof, a cutting means moveably coupled to the support means and moveable from a first state located exteriorly of a wrapped bale supported on the support means through the wrapped bale to a second state for cutting and splitting the bale into two portions and for simultaneously cutting wrapping material of the bale to form an opening in the wrapping material for accommodating the split bale therethrough, a grab mounted on the support means to abut the wrapped bale supported on the support means, and an actuator for operating the grab to grip the wrapping material of the bale, so that as the split bale is being discharged from the support means, the wrapping material is retained by the grab, thereby separating the wrapping material from the split bale.

Advantageously, the actuator is adapted to operate the grab to grip the wrapping material prior to operation of the cutting means for cutting the bale.

Preferably, the grab is adapted for gripping the wrapping material without penetrating the wrapping material. Advantageously, the grab comprises a pair of jaws operable between a release state and a gripping state for gripping the wrapping material therebetween. Ideally, each jaw defines a wrapping material gripping edge opposing the wrapping material gripping edge of the other jaw.

In one embodiment of the invention one of the jaws is moveable relative to the other jaw between the release state and the gripping state. Preferably, the moveable jaw is pivotally mounted relative to the other jaw, and is pivotal between the release state and the gripping state. Advantageously, the actuator is coupled to the moveable jaw for urging the moveable jaw between the release state and the gripping state.

In another embodiment of the invention the actuator comprises a grab operating ram. Preferably, the actuator comprises an hydraulically powered grab operating ram. Advantageously, the actuator comprises a double acting grab operating ram.

In a further embodiment of the invention in the second state the cutting means is spaced apart from a portion of the support means which engages and supports the bale to prevent cutting of the wrapping material adjacent the said portion of the support means.

Preferably, a limit means co-operable with the cutting means limits the travel of the cutting means in a direction of travel from the first state to the second state, so that in the second state the cutting means is adjacent but slightly spaced apart from the said portion of the support means which engages and supports the bale.

Advantageously, an urging means is provided for urging the cutting means between the first state and the second state. Preferably, the urging means comprises the limit means.

In one embodiment of the invention the urging means comprises at least one main ram. Preferably, the urging means comprises at least one hydraulic main ram. Advantageously, the urging means comprises at least one double acting main ram.

In one aspect of the invention the support means comprises an upstanding support framework, and at least one elongated bale support member extending transversely from a lower portion of the support framework, the bale support member forming the said portion of the support means which engages and supports the bale.

In another aspect of the invention the bale support member defines a bale support plane on which the bale is supported, and the cutting means in the first state defines with the bale support plane a bale accommodating region, the cutting means being moveable from the first state to the second state in a general direction towards the bale support plane, and the limit means being adapted to limit movement of the cutting means towards the bale support plane, so that in the second state the cutting means is adjacent but slightly spaced apart from the bale support plane.

Preferably, at least two spaced apart bale support members are provided for supporting the bale. Advantageously, each bale support member comprises an elongated tine.

In another aspect of the invention the cutting means comprises an elongated cutting blade defining a longitudinally extending elongated cutting edge.

Preferably, the cutting blade is moveable from the first state with the cutting edge spaced apart from the at least one bale support member to the second state with the cutting edge of the cutting blade located relative to the at least one support member for cutting and splitting the bale but preventing cutting of the wrapping material adjacent the at least one support member. Advantageously, the cutting blade is carried on at least one carrier arm pivotally coupled to the support framework about a main pivot axis, about which the cutting blade is moveable between the first state and the second state. Ideally, a pair of spaced apart carrier arms are pivotally coupled to the support framework about the main pivot axis for carrying the cutting blade.

Preferably, the cutting blade extends parallel to the main pivot axis. Advantageously, the main pivot axis extends parallel to the support framework. Preferably, the at least one bale support member extends transversely relative to the main pivot axis.

In one embodiment of the invention the support means is adapted for supporting the bale with a central longitudinally extending axis of the bale extending parallel to the main pivot axis. Preferably, the cutting means is adapted to split the bale substantially adjacent the central longitudinally extending axis thereof.

In one aspect of the invention the grab is mounted on the support framework at a location spaced apart upwardly from the at least one bale support member.

Preferably, the grab is spaced apart upwardly from the at least one bale support member a distance corresponding to approximately half the height of the bale measured in a generally upwardly direction from the at least one support member.

Advantageously, the bale splitter is adapted for supporting a cylindrical bale with an elongated central geometrical axis of the cylindrical bale extending substantially transversely of the at least one bale support member and extending substantially parallel to the support framework and the grab is located on the support framework a distance from the at least one support member substantially equal to half the diameter of the cylindrical bale.

In one embodiment of the invention a mounting means is provided for mounting the bale splitter to one of a front end loader of a tractor, a back end loader of a tractor and a three point linkage of a tractor.

The invention also provides a tractor comprising the bale splitter according to the invention.

Preferably, the bale splitter is mounted on one of a front end loader of the tractor, a back end loader of the tractor and a three point linkage of the tractor.

Additionally, the invention provides a method for splitting a wrapped bale and for separating wrapping material with which the bale is wrapped from the bale, the method comprising supporting the wrapped bale on a support means with the bale abutting a grab mounted on the support means, operating the grab by an actuator to grip the wrapping material of the bale, urging a cutting means which is moveably coupled to the support means from a first state located exteriorly of the bale through the bale to a second state for cutting and splitting the bale into two portions and for simultaneously cutting the wrapping material of the bale to form an opening in the wrapping material for accommodating the split bale therethrough, and discharging the split bale from the support means with the wrapping material retained by the grab to thereby separate the wrapping material from the split bale.

Advantageously, the grab is operated by the actuator to grip the wrapping material prior to operation of the cutting means for cutting the bale.

Preferably, the split bale is discharged from the support means by tilting the support means.

Advantageously, a portion of the split bale is discharged from the support means while the cutting means is in the second state, and the cutting means is urged from the second state towards the first state prior to discharging a remaining portion of the split bale from the support means. Preferably, the cutting means is returned to the first state before the remaining portion of the split bale is discharged from the support means.

In one aspect of the invention the cutting means retains the remaining portion of the split bale on the support means while the other portion thereof is being discharged from the support means.

The advantages of the bale splitter according to the invention are many. A particularly important advantage of the invention is that it readily facilitates separating of wrapping material from a wrapped bale during splitting of the wrapped bale. A further advantage of the invention is that when separated from the split bale, the wrapping material is retained in one single integral piece. This is achieved by virtue of the fact that the cutting means when in the second state having split the bale while being located relatively closely to the support means is slightly spaced apart from the support means to thereby prevent cutting of the wrapping material adjacent the support means. By preventing cutting of the portion of the wrapping material adjacent the support means, the wrapping material adjacent the two portions of the split bale remain connected by the uncut portion of the wrapping material, so that the wrapping material remains in one integral piece after the bale has been split and discharged from the bale splitter. The provision of the grab for gripping the wrapping material permits the bale to be discharged from the bale splitter while the wrapping material is gripped and retained by the grab, thereby facilitating separation of the wrapping material from the split portions of the bale. Thus, by releasing the wrapping material from the grab after the split bale has been discharged from the bale splitter, the wrapping material may be disposed of as one single integral piece of wrapping material.

A further advantage of the invention is achieved by locating the grab so that when the wrapped bale is engaged on the bale splitter, the wrapped bale engages the grab. The grab by being located to engage the wrapped bale is ideally located to grip the wrapping material prior to operation of the cutting means for splitting the bale.

A still further advantage of the invention is achieved when the grab comprises a pair of jaws which are adapted not to penetrate the wrapping material when gripped therebetween, since by gripping the wrapping material between the jaws of the grab without the jaws penetrating the wrapping material, when the grab is operated from the gripping state to the release state, the wrapping material is readily released from the grab without manual intervention. Additionally, by providing the jaws of the grab not to penetrate the wrapping material there is significantly less likelihood of the material of the bale, which typically would be fodder material being gripped by the grab and being retained by the grab when the grab is operated into the release state, thereby facilitating virtually complete separation of the bale from the wrapping material.

Figure 2:
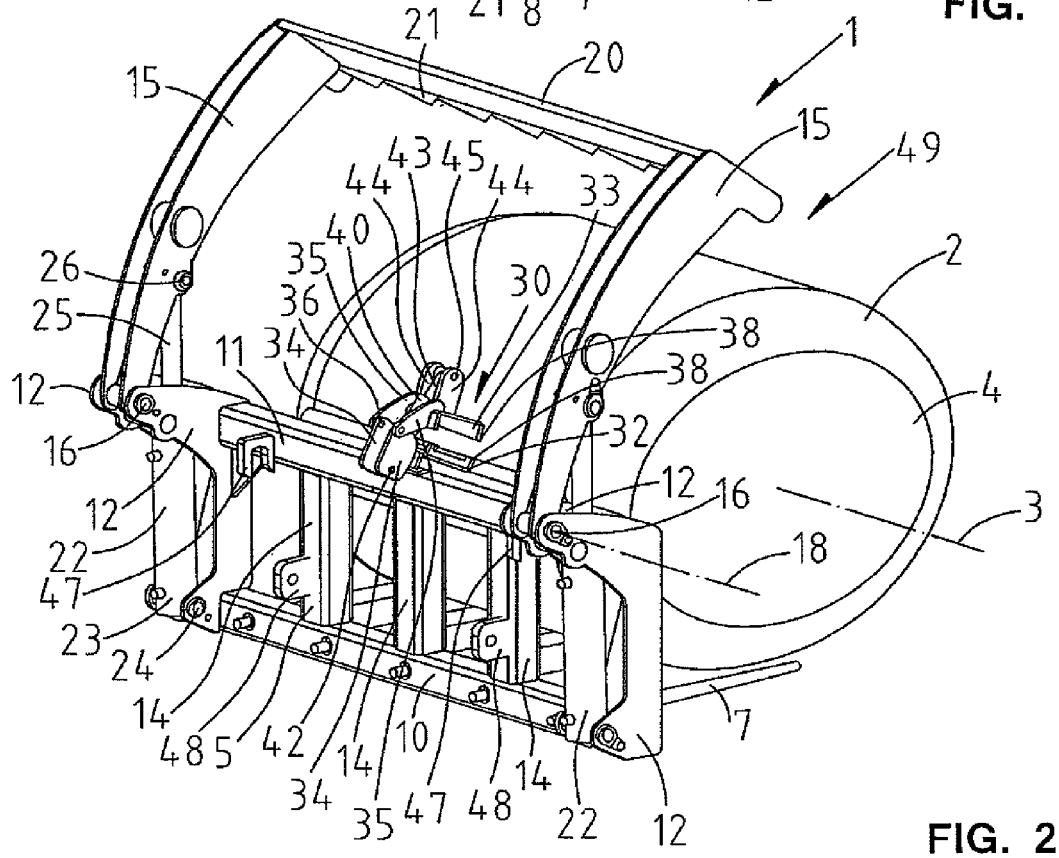
Figure 3:
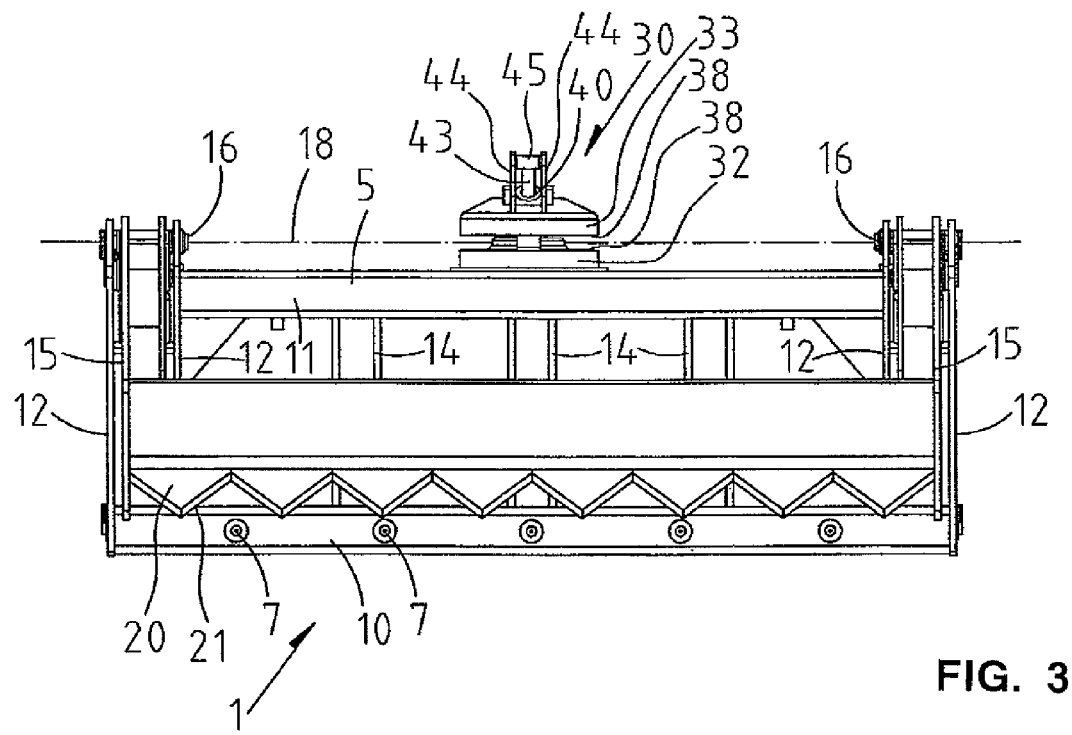
Figure 4:
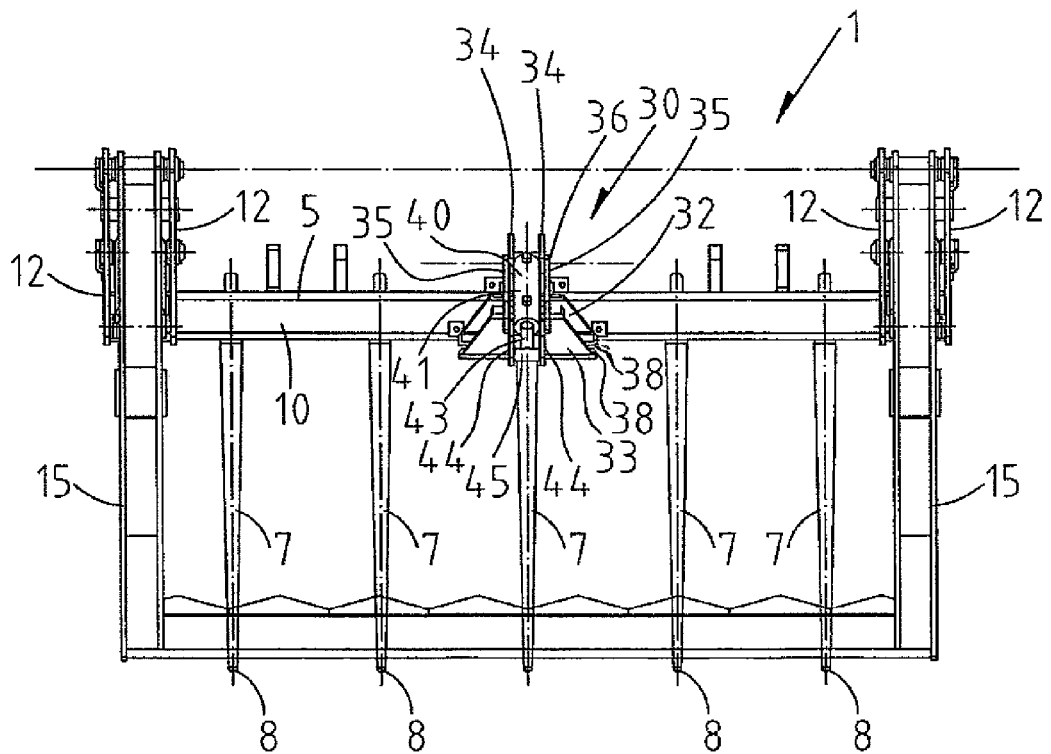
Figure 5:
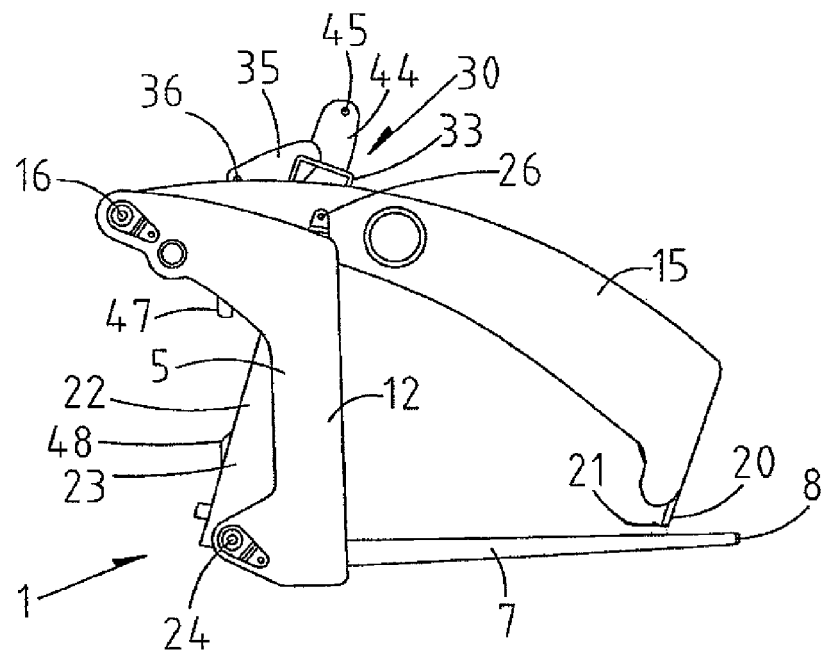
Figure 6:
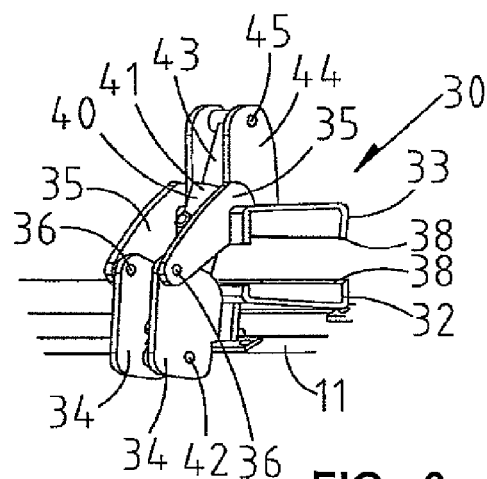
Figure 8:
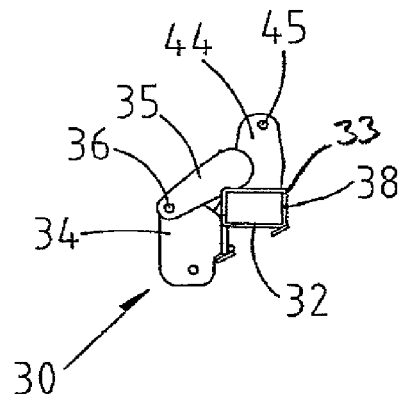
Figure 7:
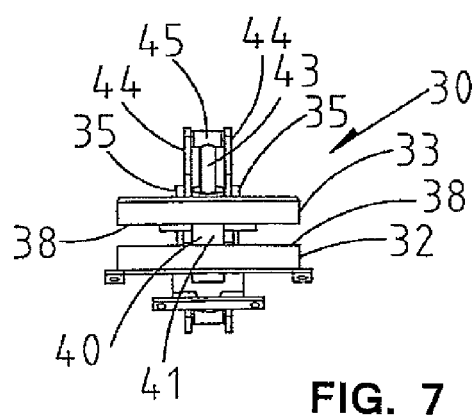
Figure 9:
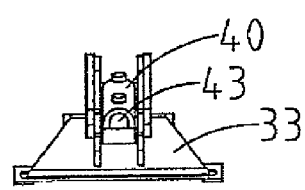
Figure 10:
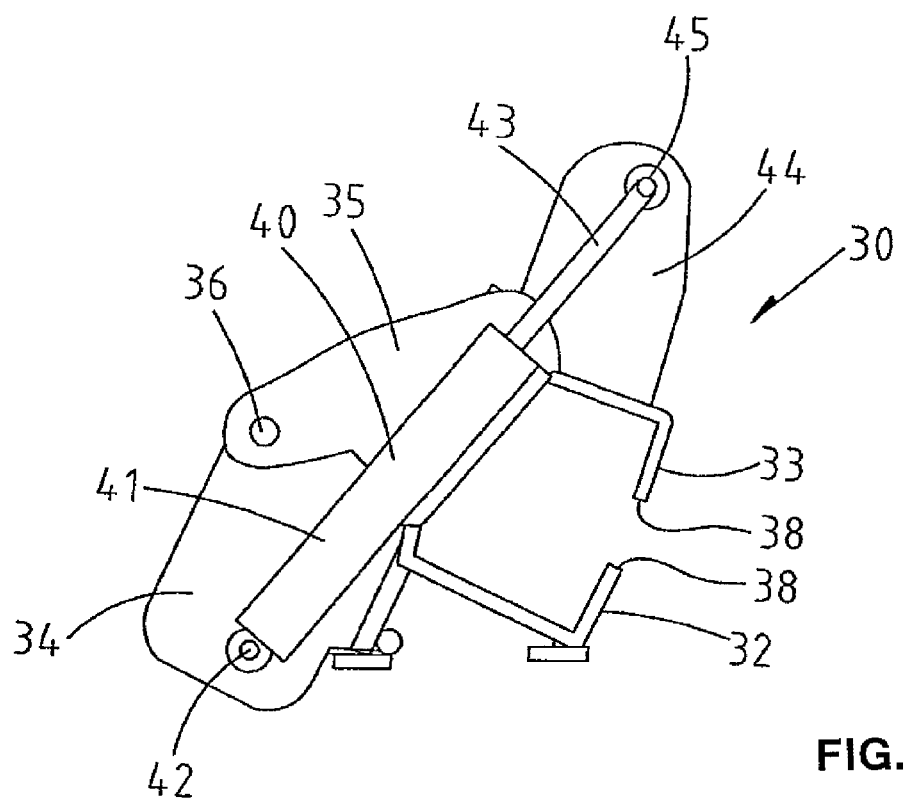
Figure 11:
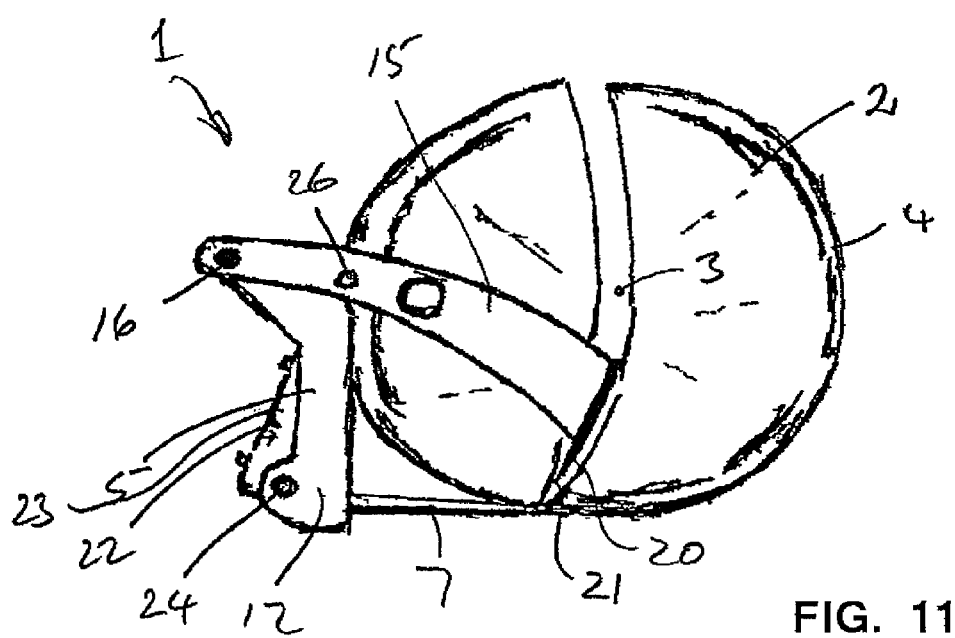
Figure 12:
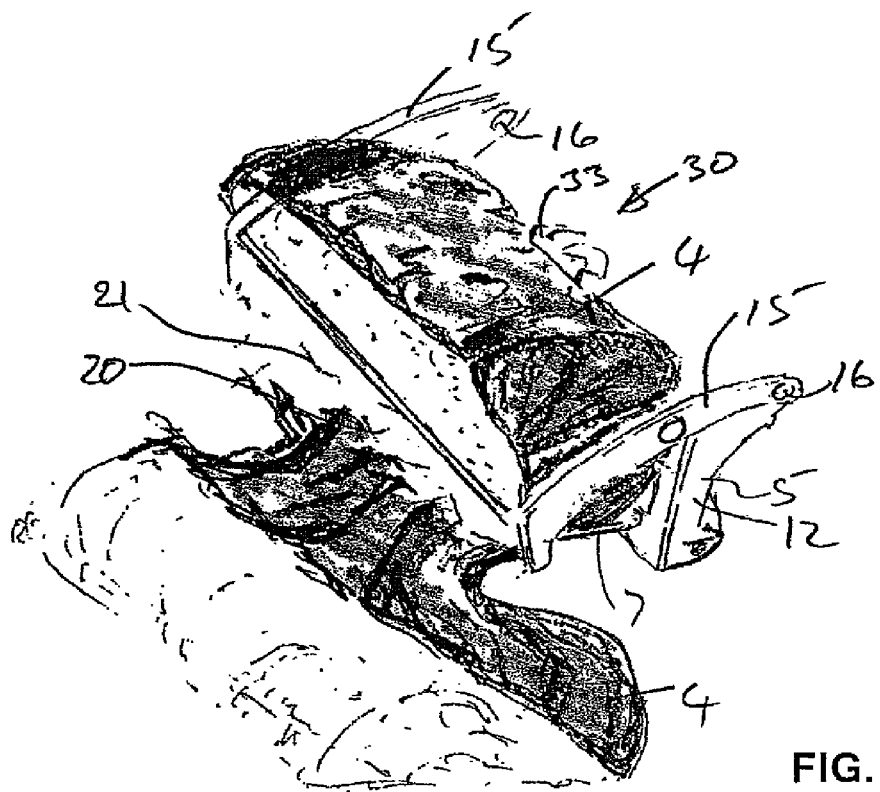
Figure 13:
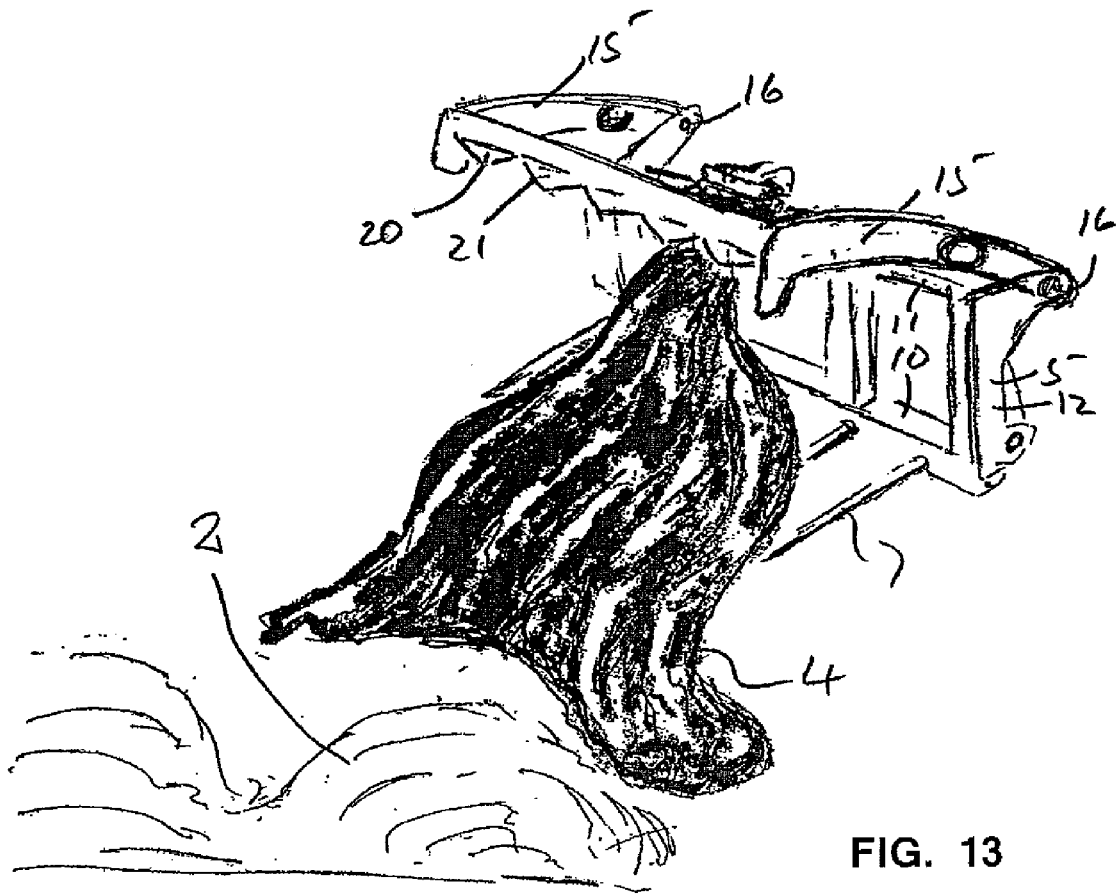

The invention will be more clearly understood from the following description of a preferred embodiment thereof, which is given by way of example only, with reference to the accompanying drawings, in which:

FIG. 1 is a front perspective view of a tractor mountable bale splitter according to the invention, FIG. 2 is a rear perspective view of the bale splitter of FIG. 1 illustrated in use, FIG. 3 is a front elevational view of the bale splitter of FIG. 1, FIG. 4 is a top plan view of the bale splitter of FIG. 1, FIG. 5 is a side elevational view of the bale splitter of FIG. 1, FIG. 6 is a perspective view of a detail of the bale splitter of FIG. 1, FIG. 7 is a front elevational view of the detail of FIG. 6 of the bale splitter of FIG. 1, FIG. 8 is a side elevational view of the detail of FIG. 6 of the bale splitter of FIG. 1, FIG. 9 is a top plan view of the detail of FIG. 6 of the bale splitter of FIG. 1, FIG. 10 is a transverse cross-sectional side elevational view of the detail of FIG. 6 of the bale splitter of FIG. 1, FIG. 11 is a side elevational view of the bale splitter of FIG. 1 in use, FIG. 12 is a perspective view of the bale splitter of FIG. 1 in a further stage of use, and FIG. 13 is a perspective view of the bale splitter of FIG. 1 in a still further stage of use.

Referring to the drawings, there is illustrated a tractor mountable bale splitter according to the invention, indicated generally by the reference numeral 1, for splitting a large wrapped cylindrical bale 2 of fodder material, typically, silage, hay or straw, along and parallel to the main longitudinally extending central geometrical axis 3 of the bale 2, and for separating the bale 2 from wrapping material 4 with which the bale 2 is wrapped. Such bales 2, as discussed above, in general, are referred to as round bales and are of diameter of 1.2 metres, and of axial length also approximately 1.2 metres. The wrapping material 4 with which such bales are wrapped is, as discussed above, heavy duty adhesive coated plastics film material. The bale splitter 1, as will be described in more detail below, is adapted for mounting on a front end loader arm (not shown) of a tractor (also not shown).

The bale splitter 1 comprises a support means which is formed by a support framework 5 and a plurality of bale support members, namely, five elongated tines 7 of steel extending outwardly from and transversely of the support framework 5 for supporting the bale 2 thereon during splitting thereof. The tines 7 taper towards their distal ends 8 for facilitating engaging the tines 7 beneath the bale 2 between the bale 2 and the ground from which the bale 2 is to be loaded onto the bale splitter 1.

The support framework 5 comprises an elongated lower member 10 of box section steel and a spaced apart parallel upper member 11 also of box section steel which are joined at their respective opposite ends by respective pairs of end plates 12 of steel plate material, and by spaced apart intermediate members 14 also of box section steel. The tines 7 extend transversely from the lower member 7 and perpendicularly from the support framework 5 for supporting the round bale 2 thereon during splitting thereof.

A pair of carrier arms 15 are pivotally coupled to the main framework 5 by pivot pins 16 which extend between the pairs of end plates 12 and define a common main pivot axis 18 about which the carrier arms 15 are pivotal. The main pivot axis 18 extends parallel to the lower and upper members 10 and 11, respectively, of the support framework 5. The carrier arms 15 carry a cutting means, namely, an elongated cutting blade 20 which extends parallel to the main pivot axis 18. The cutting blade 20 defines a longitudinally extending serrated cutting edge 21 for cutting and splitting the bale 2 and for cutting the wrapping material 3 during splitting of the bale 2. The cutting blade 20 is moveable about the main pivot axis 18 by the carrier arms 15 from a first state illustrated in FIG. 2 above and exteriorly of the bale 2 downwardly through the bale 2 for splitting thereof and for cutting the wrapping material 4 to a second state illustrated in FIG. 11 with the cutting edge 21 of the cutting blade 20 adjacent the tines 7 but slightly spaced apart above the tines 7 for facilitating splitting of the bale 2 into two halves, while at the same time preventing cutting of the wrapping material adjacent the tines 7.

An urging means comprising a pair of double acting main hydraulic rams 22 are coupled between the support framework 5 and respective ones of the carrier arms 15 for pivoting the carrier arms 15 about the main pivot axis 18 for in turn urging the cutting blade 20 between the first and second states. Each main ram 22 comprises a cylinder 23 which is pivotally coupled between the corresponding pair of end plates 22 by a first pivot mounting 24 and a piston rod 25 extending from the cylinder 23 which is pivotally coupled to the corresponding carrier arm 15 by a second pivot mounting 26.

The main rams 22 act as a limit means for limiting downward movement of the cutting blade 20, so that when the cutting blade 20 is in the second state, the cutting edge 21 thereof is adjacent to but slightly spaced apart above the tines 7 for preventing cutting of the wrapping material 4 adjacent the tines 7. By avoiding cutting of the wrapping material 4 adjacent the tines 7, the wrapping material remains in one single integral piece after splitting of the bale 2.

In this embodiment of the invention the bale splitter 1 is dimensioned to be suitable for splitting a cylindrical bale 2 of diameter of approximately 1.2 metres with the bale 2 supported on the tines 7 with the central geometrical bale axis 3 of the bale 2 extending substantially parallel to the main pivot axis 18. The main pivot axis 18 is disposed so that as the cutting blade 20 is being urged from the first state to the second state, the cutting blade 20 passes through or close to the central geometrical axis 3 of the bale 2 for splitting the bale 2 into two substantially equal halves.

A grab 30 for grabbing and gripping the wrapping material 4 of the bale 2 is mounted on the upper member 11 of the support framework 5 substantially midway between the respective opposite ends of the upper member 11. The grab 30 comprises a pair of jaws, namely, a lower stationary jaw 32, and an upper moveable jaw 33 between which the wrapping material 4 is gripped. The lower and upper jaws 32 and 33 are each formed from a piece of channel section steel, and each define an elongated gripping edge 38 which opposes the gripping edge 38 of the other of the lower and upper jaws 32 and 33 for engaging the wrapping material 4 therebetween without penetrating the wrapping material 4. The lower stationary jaw 32 extends from a pair of stationary mounting plates 34 which are welded to the upper member 11 of the support framework 5. The upper moveable jaw 33 is carried on a pair of moveable mounting plates 35 which are pivotally coupled to the stationary mounting plates 34 by a pair of pivot pins 36 which define a common secondary pivot axis 37. The upper moveable jaw 33 is pivotal about the secondary pivot axis 37 between a release state with the gripping edges 38 of the jaws 32 and 33 spaced apart from each other, as illustrated in FIG. 6, and a gripping state with the gripping edges 38 of the jaws 32 and 33 adjacent each other for gripping the wrapping material 4 therebetween, as illustrated in FIG. 8.

An actuator, which in this embodiment of the invention comprises a grab operating double acting hydraulic ram 40 acting between the stationary mounting plates 34 and the upper moveable jaw 33 urges the upper moveable jaw 33 between the release state and the gripping state. The grab operating ram 40 comprises a cylinder 41 which is pivotally coupled between the stationary mounting plates 34 by a first pivot pin 42, and a piston rod 43 extending from the cylinder 41 and pivotally coupled to a pair of coupling plates 44 extending from the upper jaw 33. A second pivot pin 45 pivotally couples the piston rod 43 to the coupling plates 44.

The grab operating ram 40 and the main rams 22 are powered by the hydraulic system of the tractor (not shown) through an hydraulic circuit (also not shown). The hydraulic circuit controls operation of the ram 40 and the main rams 22, so that the grab operating ram 40 is operated just before operation of the main rams 22. In this way, the grab 30 grips the wrapping material 4 prior to the cutting blade 20 being urged into engagement with the bale 2 for splitting thereof. The grab operating ram 40 operates the grab 30 to retain the wrapping material gripped therein, until the split bale 2 has been discharged from the bale splitter 1, thereby separating the wrapping material from the split bale 2.

In this embodiment of the invention the upper member 11 of the support framework 5 is spaced apart above the lower member 10 and in turn the tines 7 a distance such that the grab 30 is located relative to the wrapped bale 2 when the bale 2 is supported on the tines 7 to engage the wrapped bale 2 adjacent a plane which contains the central geometrical axis 3 of the bale 2 and which extends parallel to the tines 7. In other words, the grab 30 is mounted on the support framework 5 at a distance above the tines 7 which is substantially equal to half the diameter of the bale 2, so that when the wrapped bale 2 is fully engaged on the bale splitter 1, the wrapped bale engages the grab 30.

A mounting means for mounting the bale splitter 1 onto a front end loader of a tractor (not shown) comprises a pair of spaced apart upper mounting hooks 47 extending rearwardly from the upper member 11 of the support framework 5 for engaging corresponding upper mountings of the front end loader, and a pair of spaced apart lower mounting brackets 48 for engaging corresponding lower mountings of the front end loader.

In use, with the bale splitter 1 mounted on a front end loader of a tractor or other suitable vehicle, and with the main rams 22 and grab operating ram 40 coupled to the hydraulic system of the tractor through the hydraulic circuit (not shown), the bale splitter 1 is ready for use. With the cutting blade 20 raised into the first state by the main rams 22, and with the grab 30 in the release state, the tractor is driven with the tines 7 adjacent the ground for loading the bale 2 to be split onto the tines 7 with the geometrical central axis 3 of the bale 2 extending parallel to the main pivot axis 18. The bale splitter 1 is urged into engagement with the bale 2, so that the wrapping material 4 of the bale 2 abuts the grab 30 with the upper moveable jaw 33 thereof in the release state relative to the lower jaw 32. With the bale 2 loaded onto the tines 7 and engaging the grab 30, the upper moveable jaw 33 is operated by the grab operating ram 40 from the release state into the gripping state for gripping the wrapping material 4 of the bale 2 in the grab 30. The main rams 22 are then operated for urging the cutting blade 20 from the first state through the bale 2 to the second state for splitting the bale through its central geometrical axis 3. As the cutting blade 20 is urged through the bale 2, the wrapping material 4 is simultaneously cut to form a large opening in the wrapping material through which the split bale is discharged while the wrapping material is gripped by the grab 30.

When the cutting blade 20 has been urged through the bale 2 to the second state, and with the wrapping material 4 gripped by the grab 30, the front end loader is operated for tilting the bale splitter 1 with the distal ends 8 of the tines 7 extending in a generally downwardly direction for discharging one of the split portions of the split bale 2 from the bale splitter 1. The cutting blade 20 retains the other remaining portion of the bale 2 on the bale splitter 1. With the bale splitter 1 still tilted with the distal ends 8 of the tines 7 extending in a generally downwardly direction, the cutting blade 20 is urged upwardly from the second state to the first state for releasing the remaining portion of the split bale 2 from the bale splitter 1. The grab 30 continues to grip the wrapping material 4 while the remaining portion of the split bale 2 is being discharged from the bale splitter 1, and on the remaining portion of the split bale having been discharged from the bale splitter 1, the grab 30 is then operated into the release state for releasing the wrapping material 4 which is still in one single integral piece. The released wrapping material can then be appropriately disposed of.

In this embodiment of the invention the tines 7 of the bale splitter 1 effectively define a bale support plane on which the bale 2 is supported on the bale splitter 1. The bale support plane extends perpendicularly from the support framework 5. When the cutting blade 20 is in the first state, the cutting edge 21 thereof is spaced apart above the bale support plane which is defined by the tines 7, and the cutting edge 21 of the blade 20 in the first state defines with the bale support plane a bale accommodating region 49, see FIG. 2, for receiving and accommodating the wrapped bale 2 on the tines 7. As the cutting blade 20 is moved from the first state to the second state, it is moved in a general direction towards the bale support plane for splitting the bale 2 and simultaneously cutting the wrapping material 4. However, the main rams 22 limit the downward movement of the cutting blade 20 so that the movement of the cutting blade 20 towards the bale support plane is terminated before the cutting edge 21 of the cutting blade 20 reaches the bale support plane. Thus, when the cutting blade 20 is in the second state, the cutting edge 21 thereof is located relatively close to the bale support plane, but slightly spaced apart therefrom, a distance sufficient to prevent cutting of the wrapping material 4 between the cutting edge 21 of the cutting blade 20 and the tines 7. By preventing cutting of the wrapping material 4 between the cutting edge 21 of the cutting blade 20 and the tines 7 when the cutting blade 20 is in the second state, the wrapping material 4 is retained in one piece. Additionally, by cutting the wrapping material 4 in this manner with the portion of the wrapping material located between the cutting edge 21 of the cutting blade 20 and the tines 7 remaining uncut, a large opening is formed in the wrapping material 4 through which the split bale 2 exits the wrapping material 4 as the split bale 2 is being discharged from the bale splitter 1. Since the wrapping material 4 is gripped by the grab 30, the split bale can thus be discharged from the bale splitter 1 while the wrapping material 4 is retained by the grab 30. The wrapping material 4 may then be disposed of separately in one piece by operating the grab 30 into the release state for releasing the wrapping material 4 from the bale splitter 1.

A further advantage of the invention is achieved by virtue of the fact that the grab 30 is engaged by the wrapped bale when the wrapped bale 2 is fully engaged on the bale splitter 1 in that the wrapping material 4 may be gripped by the grab 30 prior to the cutting blade 20 being urged from the first state to the second state through the wrapped bale 2. By gripping the wrapping material 4 by the grab 30 prior to urging of the cutting blade 20 through the bale 2, there is no danger of the grab 30 being unable to grip the wrapping material should the bale be displaced slightly from the grab 30 as a result of urging of the cutting blade 20 through the bale 2 which in certain circumstances can occur.

While the bale splitter has been described as being of a particular shape and construction, the bale splitter may be of any other desired shape and construction.

While the urging means for urging the cutting means between the first state and the second state has been described as comprising a pair of double acting hydraulic rams, in certain cases, a single hydraulic ram may be sufficient, and it is also envisaged that other suitable urging means besides one or more double acting hydraulic rams may be provided.

It is also envisaged that while the bale splitter has been described for splitting a relatively large cylindrical bale of fodder material, it is envisaged that the bale splitter may be used for splitting any type, size or shape of wrapped bale which may be wrapped or packaged in any type of wrapping or packaging material, and it is envisaged that the bale splitter may be adapted for splitting a parallelepiped bale, of the type commonly referred to as a large square bale.

While the bale splitter has been described as being adapted for mounting onto a front end loader of a tractor, it is envisaged that the bale splitter may be adapted for mounting on any suitable operating means of a tractor or any other suitable prime mover. For example, a baler handler, or indeed, an earth moving machine. Additionally, the bale splitter may be adapted for mounting on any suitable operating means of a tractor or other prime mover, such as, for example, a back end loader or a three point linkage of a tractor.

It will also be appreciated that while the bale support means has been described as comprising a bale support framework and a plurality of tines extending therefrom, any other suitable support means may be provided, and indeed, in certain cases, it is envisaged that the tines may be replaced by a single base element extending transversely from the support framework.

While the cutting blade has been described as being carried on a pair of carrier arms, in certain cases, it is envisaged that the cutting blade may be carried on a single carrier arm, and additionally, it will be appreciated that while the cutting blade has been mounted to be moveable between the first and second states about the main pivot axis, it is envisaged that in certain cases the cutting blade may be moveable linearly with rectilinear motion between the first and second states.

While the wrapping material has been described as being of sheet material, which in general, would be provided by heavy duty plastics film, with one face thereof coated with a self-adhesive coating, any other suitable wrapping material may be provided on the bale, and in certain cases, it is envisaged that the bale may be packaged in a bag, which would act as the wrapping material.

While the hydraulic circuit through which the main rams 22 and the grab operating ram 40 are operated has been described as operating the grab operating ram 40 just prior to commencement of operation of the main rams 22 for urging the cutting blade 20 from the first state to the second state, it is envisaged in certain cases that commencement of the operation of the grab operating ram 40 and the main rams 22 may be substantially simultaneous, since in such a case, the grab 30 would be operated to grip the wrapping material prior to engagement of the wrapped bale by the cutting blade 20. Thus, the grab 30 would grip the wrapping material of the bale prior to the commencement of splitting of the bale, in case the action of the cutting blade 20 engaging and splitting the wrapped bale would displace the wrapped bale slightly from the grab.

The invention claimed is:

1. A tractor mountable bale splitter comprising
a support means for supporting a wrapped bale during splitting thereof,
a cutting means moveably coupled to the support means and moveable from a first state located exteriorly of a wrapped bale supported on the support means through the wrapped bale to a second state for cutting and splitting the bale into two portions and for simultaneously cutting wrapping material of the bale to form an opening in the wrapping material for accommodating the split bale therethrough,
a grab mounted on the support means to abut the wrapped bale supported on the support means, and
an actuator for operating the grab to grip the wrapping material of the bale, so that as the split bale is being discharged from the support means, the wrapping material is retained by the grab, thereby separating the wrapping material from the split bale.

2. A bale splitter as claimed in claim 1 in which the actuator is adapted to operate the grab to grip the wrapping material prior to operation of the cutting means for cutting the bale.

3. A bale splitter as claimed in claim 1 in which the grab is adapted for gripping the wrapping material without penetrating the wrapping material.

4. A bale splitter as claimed in claim 1 in which the grab comprises a pair of jaws operable between a release state and a gripping state for gripping the wrapping material therebetween.

5. A bale splitter as claimed in claim 4 in which each jaw defines a wrapping material gripping edge opposing the wrapping material gripping edge of the other jaw.

6. A bale splitter as claimed in claim 4 in which one of the jaws is moveable relative to the other jaw between the release state and the gripping state.

7. A bale splitter as claimed in claim 6 in which the moveable jaw is pivotally mounted relative to the other jaw, and is pivotal between the release state and the gripping state.

8. A bale splitter as claimed in claim 6 in which the actuator is coupled to the moveable jaw for urging the moveable jaw between the release state and the gripping state.

9. A bale splitter as claimed in claim 1 in which in the second state the cutting means is spaced apart from a portion of the support means which engages and supports the bale to prevent cutting of the wrapping material adjacent the said portion of the support means.

10. A bale splitter as claimed in claim 9 in which a limit means co-operable with the cutting means limits the travel of the cutting means in a direction of travel from the first state to the second state, so that in the second state the cutting means is adjacent but slightly spaced apart from the said portion of the support means which engages and supports the bale.

11. A bale splitter as claimed in claim 10 in which an urging means is provided for urging the cutting means between the first state and the second state.

12. A bale splitter as claimed in claim 11 in which the urging means comprises the limit means.

13. A bale splitter as claimed in claim 9 in which the support means comprises an upstanding support framework, and at least one elongated bale support member extending transversely from a lower portion of the support framework, the bale support member forming the said portion of the support means which engages and supports the bale.

14. A bale splitter as claimed in claim 13 in which the bale support member defines a bale support plane on which the bale is supported, and the cutting means in the first state defines with the bale support plane a bale accommodating region, the cutting means being moveable from the first state to the second state in a general direction towards the bale support plane, and the limit means being adapted to limit movement of the cutting means towards the bale support plane, so that in the second state the cutting means is adjacent but slightly spaced apart from the bale support plane.

15. A bale splitter as claimed in claim 13 in which the cutting means comprises an elongated cutting blade defining a longitudinally extending elongated cutting edge.

16. A bale splitter as claimed in claim 15 in which the cutting blade is moveable from the first state with the cutting edge spaced apart from the at least one bale support member to the second state with the cutting edge of the cutting blade located relative to the at least one support member for cutting and splitting the bale but preventing cutting of the wrapping material adjacent the at least one support member.

17. A bale splitter as claimed in claim 15 in which the cutting blade is carried on at least one carrier arm pivotally coupled to the support framework about a main pivot axis, about which the cutting blade is moveable between the first state and the second state.

18. A bale splitter as claimed in claim 17 in which a pair of spaced apart carrier arms are pivotally coupled to the support framework about the main pivot axis for carrying the cutting blade.

19. A bale splitter as claimed in claim 17 in which the cutting blade extends parallel to the main pivot axis.

20. A bale splitter as claimed in claim 17 in which the main pivot axis extends parallel to the support framework.

21. A bale splitter as claimed in claim 17 in which the at least one bale support member extends transversely relative to the main pivot axis.

22. A bale splitter as claimed in claim 17 in which the support means is adapted for supporting the bale with a central longitudinally extending axis of the bale extending parallel to the main pivot axis.

23. A bale splitter as claimed in claim 22 in which the cutting means is adapted to split the bale substantially adjacent the central longitudinally extending axis thereof.

24. A bale splitter as claimed in claim 13 in which the grab is mounted on the support framework at a location spaced apart upwardly from the at least one bale support member.

25. A bale splitter as claimed in claim 24 in which the grab is spaced apart upwardly from the at least one bale support member a distance corresponding to approximately half the height of the bale measured in a generally upwardly direction from the at least one support member.

26. A bale splitter as claimed in claim 24 in which the bale splitter is adapted for supporting a cylindrical bale with an elongated central geometrical axis of the cylindrical bale extending substantially transversely of the at least one bale support member and extending substantially parallel to the support framework and the grab is located on the support framework a distance from the at least one support member substantially equal to half the diameter of the cylindrical bale.

27. A method for splitting a wrapped bale and for separating wrapping material with which the bale is wrapped from the bale, the method comprising
  supporting the wrapped bale on a support means with the bale abutting a grab mounted on the support means,
  operating the grab by an actuator to grip the wrapping material of the bale,
  urging a cutting means which is moveably coupled to the support means from a first state located exteriorly of the bale through the bale to a second state for cutting and splitting the bale into two portions and for simultaneously cutting the wrapping material of the bale to form an opening in the wrapping material for accommodating the split bale therethrough, and
  discharging the split bale from the support means with the wrapping material retained by the grab to thereby separate the wrapping material from the split bale.

* * * * *